B. L. MALLORY.
NUT BOWL AND CRACKER.
APPLICATION FILED DEC. 22, 1919.

1,429,444.

Patented Sept. 19, 1922.

Inventor
Bonnie L. Mallory
By Hull, Smith, Brock & West
Atty's

Patented Sept. 19, 1922.

1,429,444

UNITED STATES PATENT OFFICE.

BONNIE L. MALLORY, OF CLEVELAND, OHIO.

NUT BOWL AND CRACKER.

Application filed December 22, 1919. Serial No. 346,565.

*To all whom it may concern:*

Be it known that I, BONNIE L. MALLORY, a citizen of the United States, residing at Cleveland, in the county of Cuyahoga and State of Ohio, have invented a certain new and useful Improvement in Nut Bowls and Crackers, of which the following is a full, clear, and exact description, reference being had to the accompanying drawings.

This invention relates to a combined nut bowl and cracker that is constructed of few parts, of sheet metal, making it inexpensive of manufacture, strong and durable, and causing it to lend itself readily to attractiveness of design and the requisites of sanitation.

The invention further comprehends an arrangement whereby large nuts and consequently those having harder shells and more difficult of cracking may be subjected to greater pressure than the smaller and more easily cracked nuts.

Figure 1:
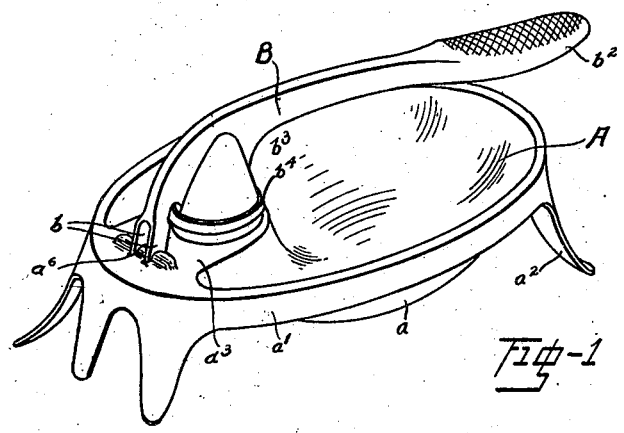
Figure 2:
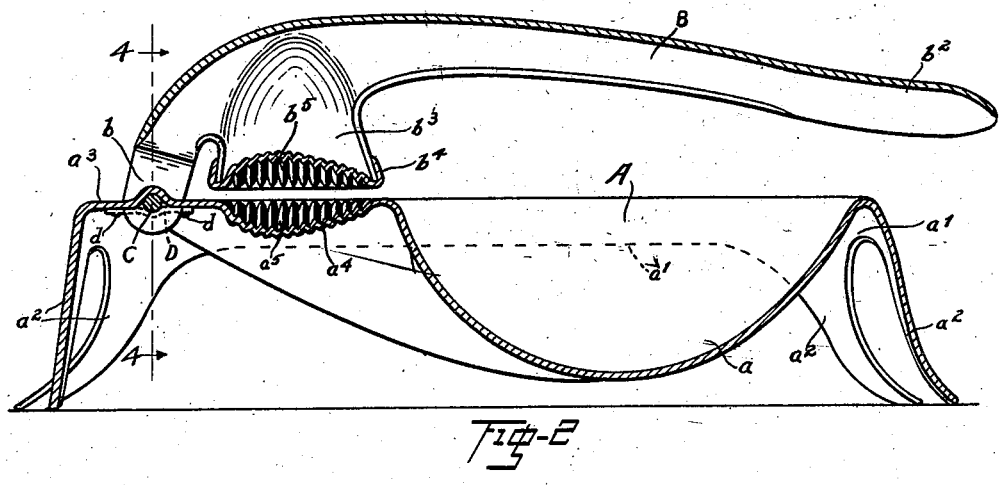
Figures 3, 4:
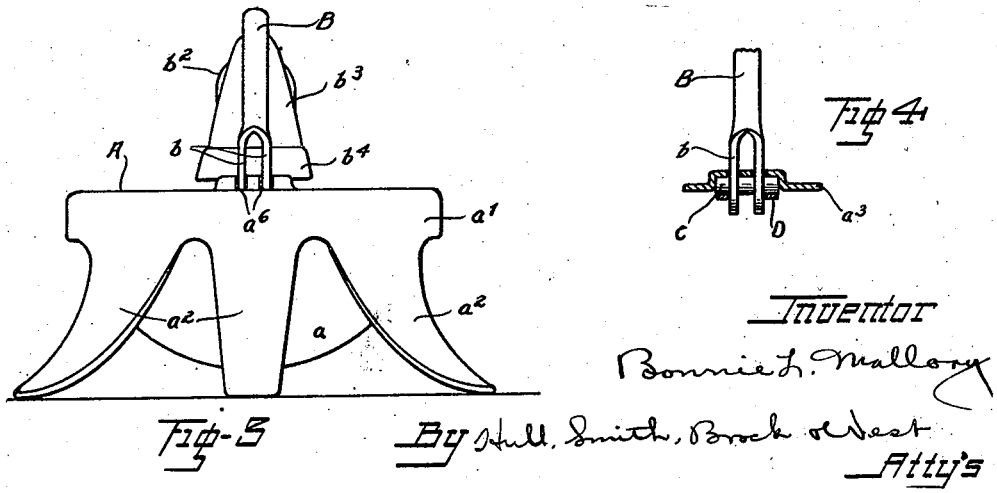

An illustrative embodiment of the invention is displayed in the accompanying drawing, wherein Fig. 1 is a perspective view of my improved nut bowl and cracker; Fig. 2 is a central longitudinal section through the same; Fig. 3 is an end elevation as viewed from the left of Fig. 2; and Fig. 4 is a sectional detail on the line 4—4 of Fig. 2.

A base A, or what I may refer to generally as the bowl, is formed of a single piece of sheet metal and has a depressed central portion $a$ constituting a receptacle for the nuts and shells; a peripheral flange $a'$ from which legs $a^2$ depend; and a flat portion $a^3$ that projects inwardly from one end of the bowl in the plane of the top thereof and has a depression $a^4$ that is provided with transverse corrugations $a^5$. This latter portion constitutes the nut sustaining anvil.

B is a lever of sheet metal, having throughout the greater part of its length, a tubular formation produced by bending the metal downwardly on each side of the longitudinal center of the lever and abutting the edges on the underneath side. At one end the lever is formed with laterally spaced ears $b$ which are perforated and project through slots $a^6$ in the flat portion $a^3$ of the bowl, and beneath such portion a pin C extends through the perforations of the ears $b$ and is held within a groove, formed by pressing the material of the portion $a^3$ upwardly in the immediate vicinity of the pin, by clips D that are shown as held in place by rivets $d$. The pin C is held against longitudinal displacement by the end walls of the groove, as illustrated in Fig. 4. The opposite end of the lever is flared to produce a hand grip portion $b^2$. Above the depression $a^4$ of the bowl, enlargements of the sides of the lever are bulged outwardly as shown at $b^3$, and the lower ends of the enlargements are capped by a plate $b^4$ having its underneath surface shaped to correspond, but reversely to the depression $a^4$ of the bowl. This portion of the lever may be regarded as the jaw of the cracker and it has transverse corrugations $b^5$, like those of the depressions $a^4$. The cap $b^4$ serves to effectually maintain the sides of the lever B against spreading in the region of the jaw.

Attention is called to the fact that the nut cavity, provided by the depression $a^4$ and the opposed recessed part of the jaw, becomes smaller as it progresses in a direction away from the pivoted end of the lever. This is to afford greater leverage when cracking larger nuts which are naturally placed in the smaller end. It will be observed also that the pull on the pin C during the cracking operation is withstood by the solid portion $a^3$ of the bowl and that the clips D serve merely to hold the parts together. Further it will be noticed that the depression $a$ which constitutes the nut and shell receptacle extends almost entirely about the cracker so that the shells naturally fall into the bowl from the front or sides thereof.

Having thus described my invention, what I claim is:—

1. As a new article of manufacture, a combined nut bowl and cracker comprising a base having a depressed portion constituting a nut and shell receptacle and a flat portion adjacent to the side wall of the receptacle and surrounding a nut receiving depression, a lever, means pivotally connecting the lever to the base adjacent the nut receiving depression, and a cupped plate applied to the lever in opposed relation to the nut receiving depression.

2. As a new article of manufacture, a combined nut bowl and cracker comprising a base having a flat portion extending inwardly from one end and in the plane of the top of the base, the base being depressed partially about said flat portion to form a nut and shell receptacle, the base being provided with a peripheral depending flange having extensions providing legs, a lever having laterally spaced perforated ears at one end, the flat portion of the base being slotted and the ears of the handle being extended therethrough, a pin inserted through the perforation of the ears below the base, means attaching the pin to the base, the flat portion having a nut receiving depression, and a cupped plate applied to the lever in opposed relation to the nut receiving depression.

3. In a combined nut bowl and cracker, the combination of a base having a peripheral flange and legs depending therefrom, the base having a flat portion extending inwardly from one end while the area thereof partially about such portion is depressed to constitute a nut and shell receptacle, the flat portion having a nut receiving depression adjacent its inner end, a lever having laterally spaced perforated ears at one end, the flat portion of the base being slotted to receive said ears, a pin extending through the perforations of the ears below the base, the base being formed with a downwardly opening recess within which the pin reposes and is confined thereby against longitudinal displacement, clips applied to the base and maintaining the pin within the recess, and a cupped plate applied to the lever in opposed relation to the nut receiving depression of the base.

4. As a new article of manufacture, a combined nut bowl and cracker comprising a base having a depressed portion constituting a nut and shell receptacle, and a part partially surrounded by said portion and constituting a nut supporting anvil, a lever constructed of a single piece of sheet metal folded downwardly on each side of the longitudinal center of the lever and having its edges abutting on the underneath side thereof, one of the ends of the lever being pivotally connected to the base and the other flared to provide a hand grip, the lever having enlargements that are bulged outwardly in a lateral direction above the anvil of the base, and a cupped plate applied to said enlargements in opposed relation to the anvil.

5. As a new article of manufacture, a base incorporating a nut supporting anvil, a lever pivoted to the base, said lever being constructed of a single piece of sheet metal and comprising a central longitudinal portion from which opposed side walls depend, and a plate applied to parts of the side walls in operative relation to the anvil and serving to retain the side walls against spreading.

In testimony whereof, I hereunto affix my signature.

BONNIE L. MALLORY.